(12) United States Patent
Choi et al.

(10) Patent No.: US 11,320,548 B2
(45) Date of Patent: May 3, 2022

(54) APPARATUS AND METHOD FOR DETECTING EARTHQUAKE USING ACCELEROMETER

(71) Applicant: NANOKEM, Gyeongsangbuk-do (KR)

(72) Inventors: Young-Hwan Choi, Seoul (KR); Sung-An Ha, Gyeongsan-si (KR)

(73) Assignee: NANOKEM, Cheongdo-gun (KR)

( * ) Notice: Subject to any disclaimer, the term of this patent is extended or adjusted under 35 U.S.C. 154(b) by 384 days.

(21) Appl. No.: 16/440,613

(22) Filed: Jun. 13, 2019

(65) Prior Publication Data

US 2019/0369274 A1    Dec. 5, 2019

Related U.S. Application Data

(60) Provisional application No. PCT/KR2019/003209, filed on Mar. 20, 2019.

(30) Foreign Application Priority Data

May 30, 2018    (KR) .......................... 10-2018-0062013

(51) Int. Cl.
| | |
|---|---|
| *G01V 1/00* | (2006.01) |
| *G01V 1/30* | (2006.01) |
| *G01P 15/18* | (2013.01) |
| *H02H 5/00* | (2006.01) |
| *G01P 15/02* | (2013.01) |
| *H02H 1/00* | (2006.01) |
| *G08B 21/10* | (2006.01) |
| *G01V 1/36* | (2006.01) |

(52) U.S. Cl.
CPC .............. *G01V 1/008* (2013.01); *G01P 15/02* (2013.01); *G01P 15/18* (2013.01); *G01V 1/30* (2013.01); *G01V 1/364* (2013.01); *G08B 21/10* (2013.01); *H02H 1/0007* (2013.01); *H02H 5/00* (2013.01); *G01V 2210/612* (2013.01)

(58) Field of Classification Search
CPC .......... G01V 1/008; G01V 1/30; G01V 1/364; G01V 2210/612; G01P 15/02; H02H 5/00; G08B 21/10
See application file for complete search history.

(56) References Cited

U.S. PATENT DOCUMENTS

2021/0141107 A1*    5/2021    Mino ..................... G01V 1/008

FOREIGN PATENT DOCUMENTS

| JP | 2013-088314 A | 5/2013 |
|---|---|---|
| KR | 10-2013-0016945 A | 2/2013 |
| KR | 10-2016-0040381 A | 4/2016 |

* cited by examiner

*Primary Examiner* — Manuel A Rivera Vargas
(74) *Attorney, Agent, or Firm* — Studebaker & Brackett PC

(57) ABSTRACT

The present invention relates to an apparatus and method for detecting an earthquake using an accelerometer. More particularly, the present invention relates to an apparatus and method for detecting an earthquake using an accelerometer, the apparatus and method being capable of improving reliability of acceleration data obtained from the accelerometer and reliably determining whether an earthquake has occurred on the basis of a change between current acceleration data and previous acceleration data.

8 Claims, 3 Drawing Sheets

APPARATUS AND METHOD FOR DETECTING EARTHQUAKE USING ACCELEROMETER

CROSS-REFERENCE TO RELATED APPLICATIONS

The present application is a continuation of International Patent Application No. PCT/KR2019/003209 filed on Mar. 20, 2019, which is based upon and claims the benefit of priority to Korean Patent Application No. 10-2018-0062013 filed on May 30, 2018. The disclosures of the above-listed applications are hereby incorporated by reference herein in their entirety.

TECHNICAL FIELD

The present invention relates to an apparatus and method for detecting an earthquake using an accelerometer. More particularly, the present invention relates to an apparatus and method for detecting an earthquake using an accelerometer, the apparatus and method being capable of improving reliability of acceleration data obtained from the accelerometer and reliably determining whether an earthquake has occurred on the basis of a change between previous acceleration data and current acceleration data.

BACKGROUND ART

In recent years, large and small earthquakes have occurred in many regions in the world, and these earthquakes have caused many casualties and economic losses. In Korea, which has been classified as a relatively safe zone in terms of earthquakes, the frequency and magnitude of earthquakes are increasing.

In addition, earthquakes cause secondary disasters such as fire ignition and explosion attributable to power line breakage, gas leakage, etc., as well as primary disasters such as collapses of buildings and roads.

Statistics show that secondary disasters cause more casualties.

Since the frequency and magnitude of earthquakes are increasing, technologies have been developed to prevent secondary disasters in areas where secondary disasters are likely to occur to minimize damage caused by secondary disasters of earthquakes.

One such area would be a site where an energy supply sector for solar energy, city gas, and electricity is installed. An energy supply sector is susceptible to secondary disasters such as large explosion and fire when energy is leaked due to an earthquake.

Therefore, for energy supply systems in the field of energy supply, earthquake detection apparatuses are installed, particularly, at positions where energy is transferred to loads such as houses, factories, industrial sites, etc. from an energy supply system to cut off energy supply to the loads when an earthquake is detected.

Generally, a conventional earthquake detection apparatus employs a three-axis accelerometer. When an earthquake occurs, acceleration data (raw data) obtained by a three-axis accelerometer is used as it is to detect an earthquake or is used after being average-filtered.

When raw acceleration data is used as it is, conventional earthquake detection apparatuses have a problem that failures such as energy supply failure frequently occur because of being prone to changes in environmental factors. On the other hand, when average filtering is performed on raw acceleration data, since only one value is generated through the average filtering, it is not appropriate to detect an earthquake involving continuous vibrations of the ground.

That is, conventional earthquake detection apparatuses (also called seismic detectors) have a problem that it is difficult for such apparatuses to obtain reliable data to detect an earthquake.

Technical Problem

Accordingly, an object of the present invention is to provide an apparatus and method for detecting an earthquake using an accelerometer, the apparatus and method being capable of improving reliability of acceleration data obtained from the accelerometer and reliably detecting occurrence of an earthquake on the basis of a change between previous acceleration data and current acceleration data.

Another object of the present invention is to provide an apparatus and method for detecting an earthquake using an accelerometer, the apparatus and method being capable of accurately detecting occurrence of an earthquake by using a gas-type three-axis accelerometer to obtain raw acceleration data, compensating an error of the raw acceleration data by reflecting a real-time temperature effect on the acceleration data to obtain reliable acceleration data, and detecting an earthquake on the basis of the reliable acceleration data.

SUMMARY

In order to accomplish the above objects of the invention, one aspect of the invention provides an apparatus for detecting an earthquake using an accelerometer, the apparatus including: an earthquake detection sensor unit including an accelerometer that detects vibration and outputs raw acceleration data according to the detected vibration; a safety circuit breaker that receives energy from an energy supply system, supplies the energy to a load, and cuts off energy supplied to the load when receiving a control signal; and a control module that receives the raw acceleration data from the earthquake detection sensor unit, performs moving average filtering on the raw acceleration data to produce current moving-average-filtered acceleration data, determines whether an earthquake has occurred on the basis of a change between a data value obtained from current moving-average-filtered acceleration data and a data value obtained from previous moving-average-filtered acceleration data, and cuts off energy supplies to the load by controlling the safety circuit breaker when it is determined that an earthquake has occurred.

The apparatus may further include a warning signal output unit that outputs a warning signal including at least one of a warning alarm sound, a warning voice message warning, a warning text message, and a warning video to a warning unit that outputs at least one of the warning alarm sound, the warning voice message warning, the warning text message, and the warning video when a warning control signal is input, wherein the control module outputs the warning control signal to the warning signal output unit when it is determined that an earthquake has occurred.

The control module includes: an acceleration data processing module that periodically collects and outputs the raw acceleration data, which is unprocessed data, from the earthquake detection sensor unit; an earthquake determination unit that performs moving average filtering on the raw acceleration data to generate current moving-average-filtered acceleration data and which determines whether an occurrence has occurred on the basis of a change between the data value obtained from previous moving-average-filtered acceleration data and the data value obtained from the current moving-average-filtered acceleration data; and a control unit that controls the acceleration data processing module to collect the raw acceleration data and controls the safety circuit breaker to cut off energy supplied to the load when the earthquake determination unit determines that an earthquake has occurred.

The earthquake determination unit may include: a data reliability assuring module that filters the acquired raw acceleration data by using a moving average filter; a change measuring module that measures the change between the data value resulting from the current moving average filtering and the data value resulting from the moving average filtering; and an earthquake determination module that determines whether an earthquake has occurred depending on whether the change is equal to or greater than a predetermined reference value and whether the change is maintained for a predetermined time or longer, and outputs earthquake occurrence determination result information to the control unit, wherein the control unit checks the earthquake occurrence determination result information and cuts off energy supplied to the load by controlling the safety circuit breaker when it is determined that an earthquake has occurred.

The apparatus may further include a temperature measuring unit that measures an atmospheric temperature and outputs temperature information to the control module. The control module may further include a temperature data processing module that collects the temperature information from the temperature measuring unit and outputs the collected temperature information to the control unit. The earthquake determination unit of the control module may further include a temperature compensation module that compensates an error of the filtered acceleration data by applying a predetermined weight to the filtered acceleration data according to a temperature indicated by the temperature information.

The accelerometer of the earthquake detection sensor unit may be a three-axis accelerometer, and the temperature compensation module may first perform a zero point process of converting X-axis and Y-axis acceleration data of X-axis, Y-axis, and Z-axis acceleration data input from the three-axis accelerometer while setting the Z-axis to zero, and then perform the temperature compensation process on the converted acceleration data.

In order to accomplish the above objects of the invention, another aspect of the invention provides a method of detecting an earthquake using an accelerometer, the method including: an acceleration data collection process in which a control module collects raw acceleration data from an earthquake detection sensor unit; an earthquake occurrence determination process in which the control module performs moving average filtering on the raw acceleration data to produce current moving-average-filtered acceleration data and determines whether an earthquake has occurred on the basis of a change between a data value obtained from the current moving-average-filtered acceleration data and a data value obtained from previous moving-average-filtered acceleration data; and an energy cut-off process in which the control module cuts off energy supplied to a load by controlling a safety circuit breaker when it is determined that an earthquake has occurred.

The method may further include a warning process in which the control module a warning signal including at least one of a warning alarm sound, a warning voice message, a warning text message, and a warning video to a warning signal output unit so that at least one of the warning alarm sound, the warning voice message, the warning text message, and the warning video is output through a warning unit.

The earthquake occurrence determination process may include: an acceleration data collection step in which an acceleration data processing module of the control module periodically collects and outputs the raw acceleration data from the earthquake detection sensor unit under control of a control unit; and an earthquake determination step in which an earthquake determination unit of the control module performs moving average filtering on the input acceleration data to produce current moving-average-filtered acceleration data and determines whether an earthquake has occurred on the basis of a change between a data value obtained from the current moving-average-filtered acceleration data and a data value obtained from previous moving-average-filtered acceleration data.

The earthquake determination step may include: a data reliability assuring step in which a data reliability assuring module performs moving average filtering on the obtained raw acceleration data; a change measuring step in which a change measuring module measures the change between the data value obtained from the current moving-average-filtered acceleration data and the data value obtained from the previous moving-average-filtered acceleration data; and an earthquake determination step in which an earthquake determination module determines whether an earthquake has occurred depending on whether the change is equal to or greater than a predetermined reference value and the change is maintained for a predetermined time or longer, and outputs earthquake occurrence determination result information to the control unit.

The method further may further include a temperature information acquiring process in which the control module acquires temperature information from a temperature measuring unit that measures an atmospheric temperature. The earthquake determination step may further include a temperature compensation step in which a temperature compensation module compensates an error of the filtered acceleration data by applying a predetermined weight to the filtered acceleration data according to a temperature indicated by the temperature information.

The earthquake determination step may further include a zero point conversion step of performing zero point conversion on X-axis, Y-axis, and Z-axis acceleration data input from a three-axis accelerometer such that the X-axis and Y-axis acceleration data are converted by setting the Z-axis to zero.

Advantageous Effects

The present invention has an advantage of improving reliability of acceleration data by performing moving average filtering on raw acceleration data obtained by an accelerometer and of obtaining acceleration data on which proper parameter information useful to determine an occurrence of an earthquake is reflected.

In addition, the present invention uses a gas-type accelerometer to obtain raw acceleration data and compensates an error of the raw acceleration data by reflecting real-time temperatures on the raw acceleration data to obtain reliable acceleration data from which occurrence of an earthquake can be accurately determined.

In addition, since the present invention can acquire reliable acceleration data as described above, it is possible to improve the accuracy of the determination of the occurrence of an earthquake. Therefore, the present invention has an effect of cutting off the energy supply to a load from an energy supply system at the most proper timing (accurate timing of occurrence of an earth quake).

In addition, the present invention has an advantage of minimizing an erroneous earthquake determination, thereby minimizing an energy supply cut-off error.

DETAILED DESCRIPTION

Herein after, the construction and operation of an accelerator-based earthquake detection apparatus according to the present invention will be described with reference to the accompanying drawings. In addition, a method of detecting an earthquake using the apparatus will be described FIG. 1 is a configuration diagram of an accelerometer-based earthquake detection apparatus according to one embodiment of the invention.

Figure 1:
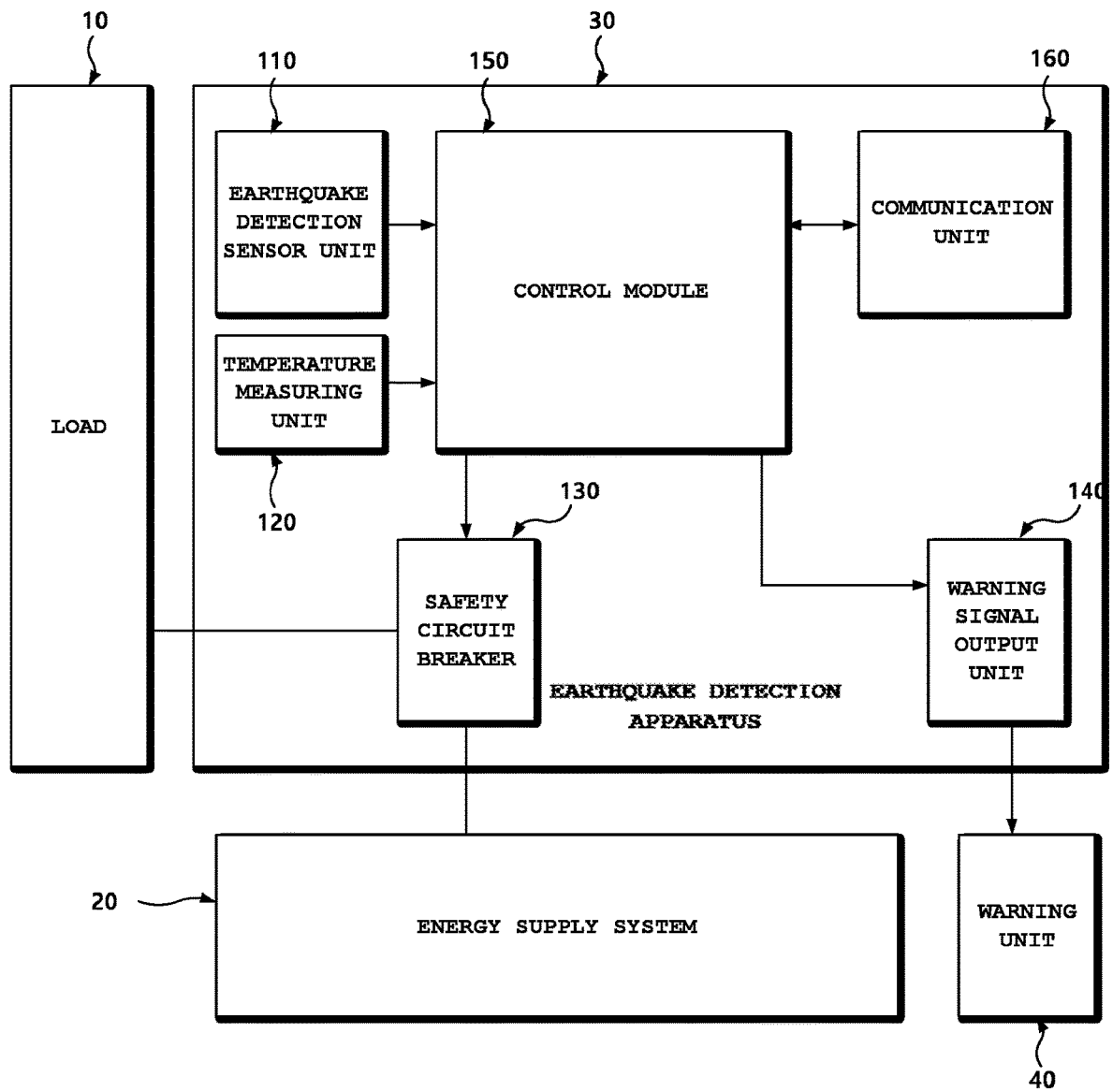
FIG. 1 is a configuration diagram of an accelerometer-based earthquake detection apparatus according to one embodiment of the invention.

Referring to FIG. 1, the accelerometer-based earthquake detection apparatus 30 according to one embodiment of the invention is provided between a load 10 and an energy supply system 20 to minimize secondary disasters such as explosion and fire by cutting off energy supplied to the load 10 from the energy supply system 20.

The load 10 may be a household boiler, a switchboard in a building, an ignition unit in a boiler, or the like. That is, the load 10 is a component that consumes energy supplied from the energy supply system. The load 10 may be any component that receives energy from the energy supply system and consumes the energy.

The energy supply system 20 may be a power generation system that supplies electric energy generated from solar heat, water power, thermal power or the like to the load 10, a gas supply system that supplies gas energy such as LPG to the load 10, a gas supply means of a boiler, or the like. The energy supply system 20 and the load may be spaced a substantial distance apart. In this case, the earthquake detection apparatus 30 is preferably disposed on the load side, or on both of the energy supply system side and the load side.

A warning unit 40 receives a warning signal from the earthquake detection apparatus 30 and generates a warning. The warning unit 40 may be at least one of a speaker, a siren, a display device, and the like. Accordingly, the warning signal may be a general control signal for sounding a siren, audio data for outputting an audio signal through a speaker, a combination of image data and audio data for outputting a video signal and an audio signal through a display device.

The earthquake detection apparatus 30 includes an earthquake detection sensor unit 110, a safety circuit breaker 130 and a control module 150. Depending on embodiments, the earthquake detection apparatus 30 may further includes a temperature measuring unit 120, a warning signal output unit 140, and a communication unit. The earthquake detection apparatus 30 monitors occurrence of an earthquake and cuts off energy supply to the load 10 from the energy supply system 20 when an earthquake is detected.

More specifically, the earthquake detection sensor unit 110 is a three-axis accelerometer. The earthquake detection sensor unit 110 generates and outputs raw acceleration data, which is unprocessed acceleration data, according to tilting and shaking motions. The acceleration data includes X-axis acceleration data, Y-axis acceleration data, and Z-axis acceleration data. The three-axis accelerometer is a gas-type sensor.

The earthquake detection sensor unit 110 has an acceleration sensor identification (ID), and a predetermined sensitivity which is set by the control module 150.

The sensitivity is used to convert the raw data information of the X-axis, Y-axis and Z-axis of the three-axis accelerometer into values in units of gravity. For example, when the sensitivity is set to 2 g, the three-axis acceleration data has values of raw data+1024 for the axis on which gravity is exerted, among the X axis, the Y axis, and the Z axis, and values of raw data−1024 for the opposite direction. When the sensitivity is set to 4 g, the three-axis acceleration data has values of raw data+512. When the sensitivity is set to 8 g, the three-axis acceleration data has values of raw data+256.

The temperature measuring unit 120 measures temperatures and outputs temperature information to the control module 150. The temperature may be the temperature of atmospheric air outside the earthquake detection apparatus 30 or the temperature of internal air inside the earthquake detection apparatus 30.

The safety circuit breaker 130 is connected to a first energy supply line connected to the energy supply system 20 and connected to a second energy supply line connected to the load 10, thereby allowing or blocking energy supply to the load 10 from the energy supply system 20. The first energy supply line and the second energy supply line may be pipes or cables depending on the kind of energy.

The warning signal output unit 140 outputs a warning signal to the warning unit 40 under the control of the control module 150.

The communication unit 160 performs wired or wireless data communication with devices such as a user mobile terminal (not shown) connected to a wired/wireless data communication network (not shown). The communication unit 160 can perform data communication with a system in which the earthquake detection apparatus according to the present invention is installed or with a user mobile terminal that uses or manages the earthquake detection apparatus. Thus, when an earthquake is detected, the communication unit 160 transmits a notification and warning (message) to the user mobile terminal.

The control module 150 controls the overall operation of the earthquake detection apparatus 30 according to the present invention and is formed in the form of a microcontroller unit (MCU).

The configuration and operation of the control module 150 will be described in detail with reference to FIG. 2.

Figure 2:
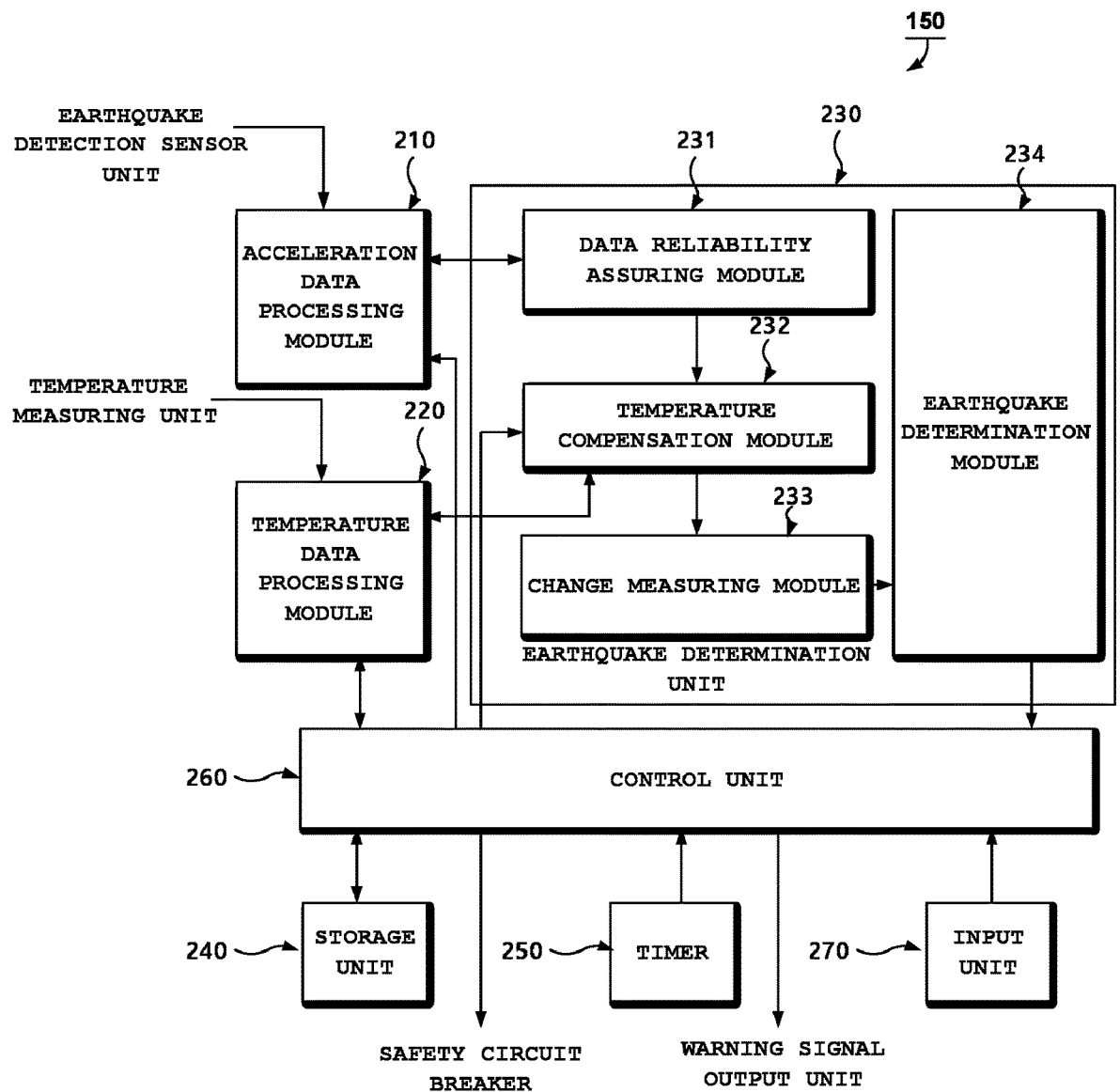
FIG. 2 is a configuration diagram illustrating the details of a control module of the accelerometer-based earthquake detection apparatus according to one embodiment of the invention.

FIG. 2 is a configuration diagram illustrating the details of the control module of the accelerometer-based earthquake detection apparatus according to one embodiment of the invention.

Referring to FIG. 2, the control module 150 includes an acceleration data processing module 210, a temperature data processing module 220, an earthquake determination unit 230, a storage unit 240, a timer 250, a control unit 260, and an input unit 270.

The acceleration data processing module 210 collects acceleration data periodically from the earthquake detection sensor unit 110 under the control of the control unit 260 or receives acceleration data periodically from the earthquake detection sensor unit 110 according to a clock transmitted from the timer 250, and transmits the collected or received acceleration data to the earthquake determination unit 230.

The temperature data processing module 220 receives temperature information from the temperature measuring unit 120 under the control of the control unit 260 or the earthquake determination unit 230 and outputs the temperature information to the control unit 260 or the earthquake determination unit 230. That is, the temperature data processing module 220 outputs the temperature information to a component which controls the temperature data processing module 220. When the temperature information is provided to the control unit 260, the control unit 260 relays the temperature information to the earthquake determination unit 230.

The storage unit 240 includes a program area for storing a control program for controlling the overall operation of the earthquake detection apparatus 30 according to the present invention, a temporary area for temporarily storing data generated during the execution of the control program, and a data area for semi-permanently storing data generated during execution of the control program. According to the present invention, within the data region, temperature compensation information that defines weights according to temperatures is stored.

The timer 250 generates a clock for counting a time and provides the clock to the control unit 260. Alternatively, the timer 250 may send the clock to a different unit depending on embodiments.

The input unit 270 includes at least one of operation means, such as a button, a key, and a switch, for setting the sensitivity of the earthquake detection sensor unit 110 and outputs an input signal corresponding to the operated operation means to the control unit 260.

The control unit 260 receives a sensitivity setting value that is input through the input unit 270 and sets the sensitivity of the earthquake detection sensor unit 110 on the basis of the sensitivity setting value. The control unit 260 activates the acceleration data processing module 210 at a predetermined cycle according to the clock input from the timer 250 so that the acceleration data can be periodically collected according to the clock and stored in the storage unit 240.

When the earthquake occurrence result information inputted from the earthquake determination unit 230 indicates that an earthquake has occurred, the control unit 260 outputs a cut-off control signal to the safety circuit breaker 130 and a warning control signal to the warning unit 140, thereby cutting off energy supply to a load and issuing a warning. Alternatively, the control unit 260 may perform both of the processes of cutting off energy supply and activating a warning at the same time.

In addition, the control unit 260 loads preliminarily stored identification information of the user mobile terminals when an earthquake occurs, generates an earthquake detection notification and warning (message) for notifying that an earthquake has occurred, and transmits the earthquake detection notification and warning to the user mobile terminals corresponding to the loaded identification information.

The earthquake determination unit 230 includes a data reliability assuring module 231, a change measuring module 233, and an earthquake determination module 234. In another embodiment, the earthquake determination unit 230 further includes a temperature compensation module 232.

The earthquake determination unit 230 determines whether or not an earthquake has occurred on the basis of the acceleration data input from the acceleration data processing module 210 and outputs earthquake occurrence determination result information to the control unit 260.

Specifically, the data reliability assuring module 231 performs a reliability assurance process of filtering the acceleration data, which is the raw data input from the acceleration data processing module 210, with a moving average filter, and converts the raw acceleration data into reliable acceleration data.

The data reliability assuring module 231 according to the present invention discards old data that is n-th or more ahead of current data and applies moving average filtering to a predetermined number of pieces of recent acceleration data. In order to reduce the amount of computation, the data reliability assuring module 231 preferably employs a batch-wise method of obtaining an average of only a predetermined number of pieces of recent acceleration data.

The change measuring module 233 compares the data value of the most recently filtered acceleration data with the data value of the previously filtered acceleration data to calculate the change between the compared values, and outputs the calculation result to the earthquake determination module 234.

According to another embodiment in which the temperature compensation module 232 is further included, the temperature compensation module 232 receives temperature information from the temperature measuring unit 120 via the temperature data processing module 220 or via the control unit 260, loads the weights corresponding to the obtained temperature information from the storage unit 240 via the control unit 260, and then corrects an error of the acceleration data attributable to temperature fluctuations by applying a predetermined weight determined according to the detected temperature to the filtered acceleration data.

In addition, for the X-axis, Y-axis, and Z-axis acceleration data input from the three-axis accelerometer, the temperature compensation module 232 performs a zero point conversion process of converting the X-axis and Y-axis acceleration data by setting the Z-axis to zero. The zero point conversion process is preferably performed prior to the temperature compensation process.

In this case, the change measuring module 233 compares the data value of the current acceleration data that has undergone the data reliability processing, the temperature compensation process, and the zero point conversion process with the data value of the previous acceleration data and provides the value of the change between the compared data values to the earthquake determination module 234.

The earthquake determination module 234 determines that an earthquake has occurred when the value of the change input from the change measuring module 233 continuously exceeds a predetermined reference value for a predetermined time or longer and otherwise determines that an earthquake has not occurred. After determining whether an earthquake has occurred, the earthquake determination module 234 outputs earthquake occurrence determination result information including the result of the earthquake occurrence determination to the control unit 260.

Figure 3:
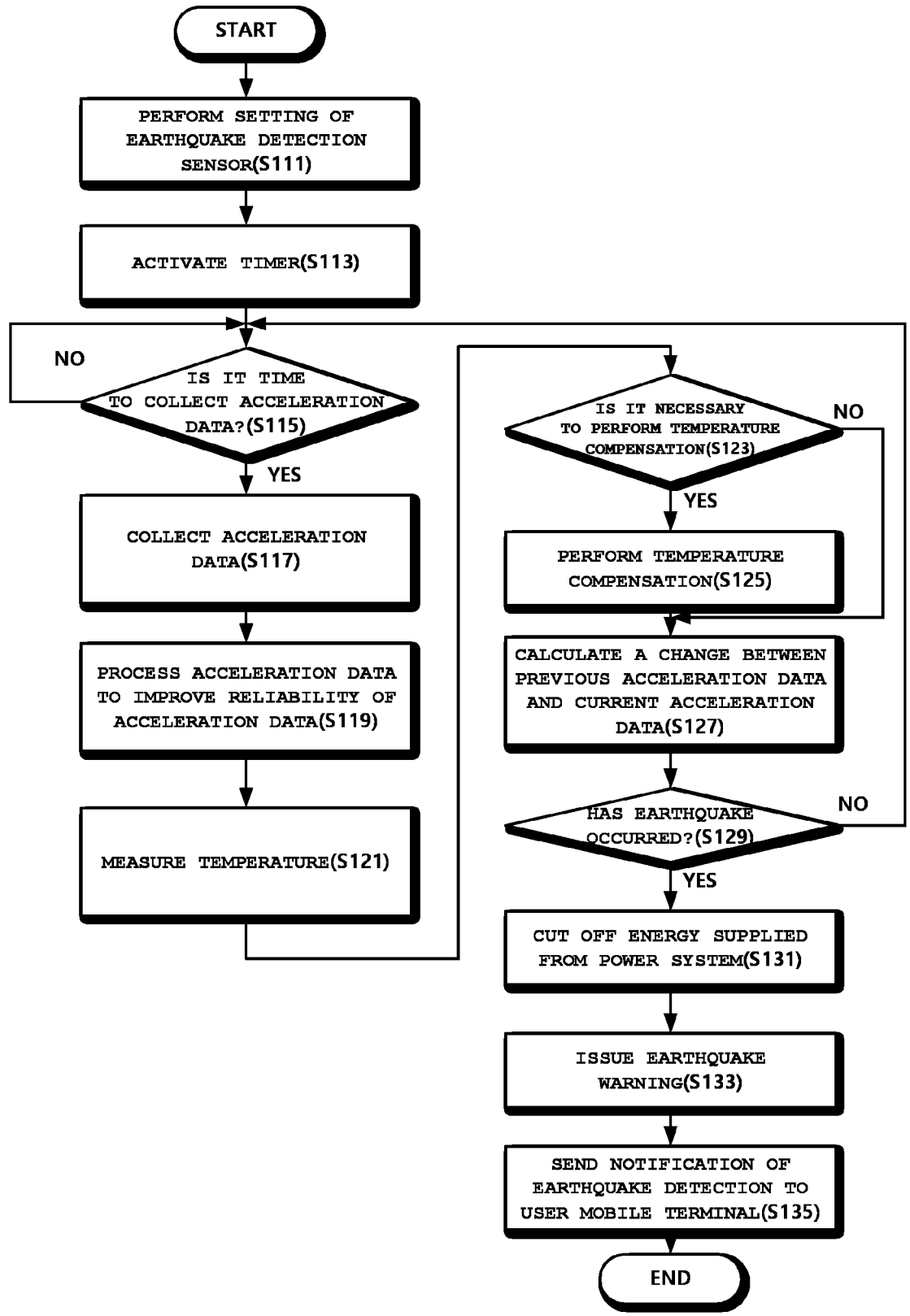
FIG. 3 is a flowchart illustrating a method of detecting an earthquake using an accelerometer, according to one embodiment of the present invention.

FIG. 3 is a flowchart illustrating a method of detecting an earthquake using an accelerometer, according to one embodiment of the present invention.

Referring to FIG. 3, when settings information including the sensitivity of the accelerometer of the earthquake detection sensor unit 110 is input through the input unit 270, the control unit 260 of the control module 150 performs a sensor parameter setting process of storing the values of settings of the accelerometer in the storage unit 240 by activating the acceleration data processing module 210.

When the sensor parameter setting process is completed, the control unit 260 activates the timer 250 (S113) and determines whether it is time to collect acceleration data at every predetermined cycle (S115). When it is time to collect the acceleration data, the control unit 260 controls the acceleration data processing module 210 to request acceleration data from the earthquake detection sensor unit 110 and collects the acceleration data from the earthquake detection sensor unit 110 (S117).

The acceleration data collected by the acceleration data processing module 210 is directly input to the earthquake determination unit 230 or is indirectly input to the earthquake determination unit 230 via the control unit 260.

When the acceleration data is input, the earthquake determination unit 230 performs a reliability assurance process of activating the data reliability assuring module 231 to apply moving average filtering to the acceleration data, which is raw data (i.e. unprocessed data) (S119).

When the reliability assurance process for the acceleration data is completed, the earthquake determination unit 230 activates the temperature compensation module 232 so that the temperature compensation module 232 obtains temperature information from the temperature measuring unit 120 (S121). Then, the earthquake determination unit 230 determines whether the temperature compensation is necessary by checking the temperature information and referring to a weight-and-temperature table stored in the storage unit 240 (S123). When temperature compensation for the acceleration data is necessary, the temperature compensation is performed by applying the weights corresponding to the temperatures to the acceleration data (S125).

The temperature compensation module 232 performs the temperature compensation process on the acceleration data after performing the above-described zero point conversion process on the acceleration data, according to an embodiment of the present invention (not shown).

The earthquake determination module 234 compares the data value of the acceleration data which has undergone at least one of the filtering, zero point conversion, and temperature compensation with the data value of the previously received acceleration data to calculate the change between the compared data values (S127) and determines whether an earthquake has occurred depending on whether the change has exceeded a predetermined reference value for a predetermined time or longer (S129).

When it is determined that an earthquake has occurred, the earthquake determination module 234 outputs the earthquake occurrence determination result information including the earthquake occurrence information to the control unit 260.

At this time, the control unit 260 controls the safety circuit breaker 130 to cut off the energy supplied from the energy supply system 20 to the load 10 (S131) and controls the warning signal output unit 140 to control the warning unit 40 to generate an earthquake detection warning (S133).

Although the safety circuit breaker 130 and the alarm output unit 140 are controlled by the control unit 260 in the embodiment described above, the safety circuit breaker 130 and the alarm output unit 140 can be controlled by the earthquake determination module 234.

When an earthquake is detected, the control unit 260 loads the stored identification information of the user mobile terminals, generates an earthquake detection notification and warning (message) for notifying that an earthquake has occurred, and transmits the earthquake detection notification and warning to the user mobile terminals corresponding to the loaded identification information. The earthquake occurrence notification may be performed after the earthquake detection warning is issued as shown in FIG. 3, or may be performed immediately after the earthquake detection (S129).

While the present invention has been described with reference to exemplary embodiments, it is to be understood that the invention is not limited to the disclosed exemplary embodiments but can be modified, changed, altered, substituted without departing from the spirit of the appended claims. It is to be understood that such modifications, changes, alterations, substitutions, and additions also fall within the scope of the invention when they do not depart from the spirit of the appended claims.

The invention claimed is:

1. An apparatus for detecting an earthquake using an accelerometer, the apparatus comprising:
    an earthquake detection sensor unit including an accelerometer that detects vibration and outputs acceleration data according to the detected vibration;
    a safety circuit breaker that receives energy from an energy supply system, supplies the energy to a load, and cuts off energy supply to the load when receiving a control signal; and
    a control module configured to receive the acceleration data from the earthquake detection sensor unit, perform moving average filtering on the received acceleration data to produce current moving-average-filtered acceleration data, determine whether an earthquake has occurred on the basis of a change between a data value of previous moving-average-filtered acceleration data and a data value of the current moving-average-filtered acceleration data, and control the safety circuit breaker to cut off the energy supply to the load when it is determined that an earthquake has occurred,
    wherein the control module comprises:
    an acceleration data processing module that periodically collects and outputs acceleration data, which is unprocessed raw data, from the earthquake detection sensor unit;
    an earthquake determination unit that performs moving average filtering on the raw acceleration data to generate current moving-average-filtered acceleration data and which determines whether an occurrence has occurred on the basis of a change between a data value of previous moving-average-filtered acceleration data and a data value of the current moving-average-filtered acceleration data;
    a control unit that controls the acceleration data processing module to collect the raw acceleration data and controls the safety circuit breaker to cut off energy supply to the load when the earthquake determination unit determines that an earthquake has occurred; and
    wherein the earthquake determination unit comprises:
    a data reliability assuring module that filters the acquired raw acceleration data by using a moving average filter;
    a change measuring module that measures a change between the data value of the current moving-average-filtered and temperature compensated acceleration data and the data value of the previous moving-average-filtered acceleration data; and
    an earthquake determination module that determines whether an earthquake has occurred depending on whether the change is equal to or greater than a predetermined reference value and whether the change is maintained for a predetermined period of time or longer, and outputs earthquake occurrence determination result information to the control unit, and wherein the control unit checks the earthquake occurrence determination result information and cuts off energy supply to the load by controlling the safety circuit breaker when it is determined that an earthquake has occurred.

2. The apparatus according to claim 1, further comprising a temperature measuring unit that measures an atmospheric temperature and outputs temperature information to the control module, wherein the control module further comprises a temperature data processing module that collects the temperature information from the temperature measuring unit and outputs the collected temperature information to the control unit, and wherein the earthquake determination unit of the control module further comprises a temperature compensation module that performs temperature compensation on the filtered acceleration data by applying a predetermined weight to the filtered acceleration data according to a temperature indicated by the temperature information.

3. The apparatus according to claim 2, wherein the accelerometer of the earthquake detection sensor unit is a three-axis accelerometer, and wherein the temperature compensation module performs a zero point conversion process on X-axis, Y-axis, and Z-axis acceleration data input from the three-axis accelerometer in a manner of converting the X-axis and Y-axis acceleration data while setting the Z-axis to zero, and then performs the temperature compensation on the acceleration data that has undergone the zero point conversion process.

4. The apparatus according to claim 1, further comprising a warning signal output unit configured to output a warning signal including at least of a warning alarm sound, a warning voice message, a warning text message, and a warning video to a warning unit that outputs at least one of the warning alarm sound, the warning voice message, the warning text message, and the warning video when a warning control signal is input, wherein the control module outputs the warning control signal to the warning signal output unit when it is determined that an earthquake has occurred.

5. A method of detecting an earthquake using an accelerometer, the method comprising:

an acceleration data collection process in which a control module collects raw acceleration data from an earthquake detection sensor unit;

an earthquake occurrence determination process in which the control module determines whether an earthquake has occurred by applying moving average filtering on the raw acceleration data and performing a temperature compensation according to the temperature information on the raw acceleration data which is input currently to obtain a current data value, comparing the current data value with a previous data value obtained by applying moving average filtering on previous raw acceleration data, and determining whether an earthquake has occurred on the basis of a change between the current data value and the previous data value; and an energy cut-off process in which the control module controls a safety circuit breaker to cut off energy supplied to a load when it is determined that an earthquake has occurred;

wherein the earthquake occurrence determination process comprises:

an acceleration data collection step in which an acceleration data processing module of the control module periodically collects the raw acceleration data from the earthquake detection sensor unit and outputs the collected raw acceleration data under control of a control unit; and an earthquake determination step in which an earthquake determination unit of the control module performs moving average filtering on the input raw acceleration data to produce current moving-average-filtered acceleration data and determines whether an earthquake has occurred on the basis of a change between a data, and wherein the earthquake determination step comprises:

a data reliability assuring step in which a data reliability assuring module performs moving average filtering on the obtained raw acceleration data;

a change measuring step in which a change measuring module measures the change between the data value obtained from the current moving-average-filtered acceleration data and the data value obtained from the previous moving-average-filtered acceleration data; and an earthquake determination step in which an earthquake determination module determines whether an earthquake has occurred depending on whether the change is equal to or greater than a predetermined reference value and the change is maintained for a predetermined period of time or longer, and outputs earthquake occurrence determination result information to the control unit.

6. The method according to claim 5, further comprising a temperature information acquiring process in which the control module acquires temperature information from a temperature measuring unit that measures an atmospheric temperature, wherein the earthquake determination step further comprises a temperature compensation step performed after the data reliability assuring step, the temperature compensation step being a step in which a temperature compensation module applies a predetermined weight to the moving-average-filtered acceleration data according to a temperature indicated by the temperature information.

7. The method according to claim 6, wherein the earthquake determination step further comprises a zero point conversion step in which X-axis and Y-axis data of X-axis, Y-axis, and Z-axis acceleration data input from a three-axis accelerometer are converted while setting the Z-axis to zero.

8. The method according to claim 5, further comprising a warning process in which the control module outputs a warning signal including at least one of a warning alarm sound, a warning voice message, a warning text message, and a warning video to a warning signal output unit such that the warning signal output unit outputs at least one of the warning alarm sound, the warning voice message, the warning text message, and the warning video through a warning unit.

* * * * *